UNITED STATES PATENT OFFICE.

OTTO G. C. L. J. OVERBECK, OF GRIMSBY, ENGLAND.

PROCESS OF MAKING NUTRITIVE EXTRACTS.

SPECIFICATION forming part of Letters Patent No. 632,968, dated September 12, 1899.

Application filed December 29, 1898. Serial No. 700,604. (No specimens.)

*To all whom it may concern:*

Be it known that I, OTTO GERHARD CHRISTOPH LUDWIG JOSEPH OVERBECK, a subject of the Queen of Great Britain, residing at Grimsby, in the county of Lincoln, England, have invented a new or Improved Nutritious Extract, of which the following is a full, clear, and exact description, and for which I have applied for British patent, No. 15,841, dated July 20, 1898.

The invention relates to a new or improved nutritious extract.

In carrying my invention into effect I take any suitable quantity of pressed yeast and place the same in boiling water, or, if necessary, keep the mixture boiling until the yeast has become liquefied and the yeast-cells are burst. I then boil the mixture for a few minutes, after which I cool it or allow it to cool to about 130° to 140° Fahrenheit, or, if preferred, cold water may be added to cool it to about 130° to 140° Fahrenheit. I then add malt-combs weighing about one-sixth to one-half the weight of the pressed yeast, and the whole is digested at from 130° to 140° Fahrenheit for from two to three hours, (shorter or longer if necessary in each particular case.) The mixture is then boiled for about half an hour, a little chalk or other suitable alkali being added to the liquid to neutralize acidity and to clarify the same, after which the liquid is run off from the mass. This liquid mixture, containing an admixture of dead yeast-cells and some malt-combs, is then filtered or mechanically clarified by analogous methods, and the filtered liquid product is boiled down to any suitable consistency, constituting the finished product, and may be salted or flavored to taste.

What I claim as my invention, and desire to secure by Letters Patent, is—

The process of obtaining an improved nutritious extract, which consists in placing pressed yeast in boiling water, allowing it to liquefy and the yeast-cells to burst, boiling the mixture and then allowing it to cool to about 135° Fahrenheit, adding malt-combs, digesting the materials at about 135° Fahrenheit, then boiling the mixture and adding sufficient alkali to neutralize acidity and clarify the material, filtering the liquid and concentrating the product by evaporation, substantially as set forth.

In testimony whereof I affix my signature in presence of two witnesses.

O. G. C. L. J. OVERBECK.

Witnesses:
  H. J. F. CROSBY,
  T. W. BONSALL.